US009792533B2

(12) United States Patent
Nogayama et al.

(10) Patent No.: US 9,792,533 B2
(45) Date of Patent: Oct. 17, 2017

(54) PROCESSING APPARATUS, PROCESSING METHOD, AND PROGRAM FOR DETERMINING AN IMAGE TAKING POSITION

(71) Applicant: International Business Machines Corporation, Armonk, NY (US)

(72) Inventors: Takahide Nogayama, Tokyo (JP); Toshihiro Takahashi, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/970,787

(22) Filed: Dec. 16, 2015

(65) Prior Publication Data
US 2016/0203390 A1    Jul. 14, 2016

(30) Foreign Application Priority Data

Dec. 18, 2014   (JP) .................................. 2014-256062

(51) Int. Cl.
G06K 9/62       (2006.01)
G06K 9/52       (2006.01)
G06T 7/579      (2017.01)

(52) U.S. Cl.
CPC ............ G06K 9/6267 (2013.01); G06K 9/52 (2013.01); G06T 7/579 (2017.01); *G06T 2207/30168* (2013.01); *G06T 2207/30244* (2013.01)

(58) Field of Classification Search
CPC ........ G06K 9/52; G06K 9/6267; G06T 7/579; G06T 2207/30168; G06T 2207/30244
See application file for complete search history.

(56) References Cited

U.S. PATENT DOCUMENTS

2014/0363048 A1*  12/2014  Vrcelj ...................... G06K 9/78
                                                                    382/103

FOREIGN PATENT DOCUMENTS

JP    2010-102501    *  5/2010    ............. G06F 17/30
JP    2010102501         5/2010
(Continued)

OTHER PUBLICATIONS

Batra, D., et al., "An Alternative Formulation for Five Point Relative Pose Problem", IEEE Workshop on Motion and Video Computing, Feb. 23-24, 2007, pp. 1-6.
(Continued)

*Primary Examiner* — Amara Abdi
(74) *Attorney, Agent, or Firm* — Fleit Gibbons Gutman Bongini Bianco PL; Thomas S. Grzesik

(57) ABSTRACT

A three-dimensional shape of a subject is acquired in a healthy and realistic calculation time, using two-dimensional images taken by a general camera having a narrow angle of view. The processing apparatus calculates an image taking position of each of a plurality of images, and includes: a storage unit for storing thereinto a selected image set including images whose image taking position has been calculated; a calculation unit calculates a plurality of image taking position candidates for an unselected image of the plurality of images; a selection unit selects an optimum image taking position having a highest degree of coincidence in correspondence points, from among the plurality of image taking position candidates for the unselected image; and a determination unit determines whether or not the unselected image is added to the selected image set.

19 Claims, 5 Drawing Sheets

(56) References Cited

FOREIGN PATENT DOCUMENTS

| JP | 2011-008507 | * | 1/2011 | ............. | G06F 17/30 |
| JP | 2011008507 | | 1/2011 | | |
| JP | 2013-218396 | * | 10/2013 | ............... | G06T 7/00 |
| JP | 2013218396 | | 10/2013 | | |
| WO | 2012032747 | | 3/2012 | | |
| WO | WO 2012/032747 | * | 3/2012 | ............... | G06T 7/60 |

OTHER PUBLICATIONS

Snavely, N., "Bundler: Structure from Motion (SfM) for Unordered Image Collections", searched http://www.cs.cornell.edu/~snavely/bundled on Dec. 8, 2014, pp. 1-2.

Snavely, N.,"Bundler Structure from Motion Toolkit", searched https://github.com/snavely/bundler_sfm on Dec. 8, 2014, pp. 1-7.

* cited by examiner

[Figure 1]
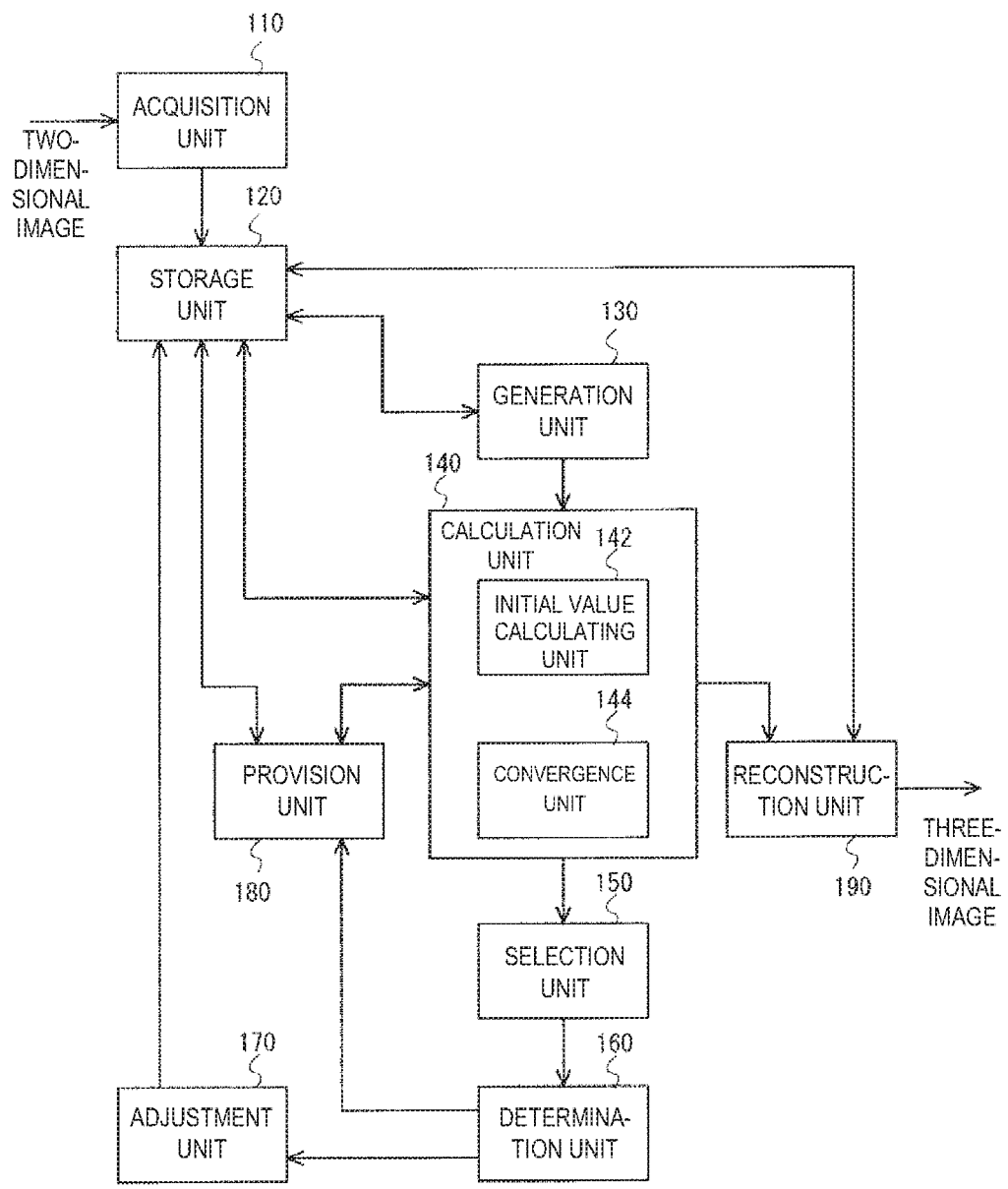

[Figure 2]
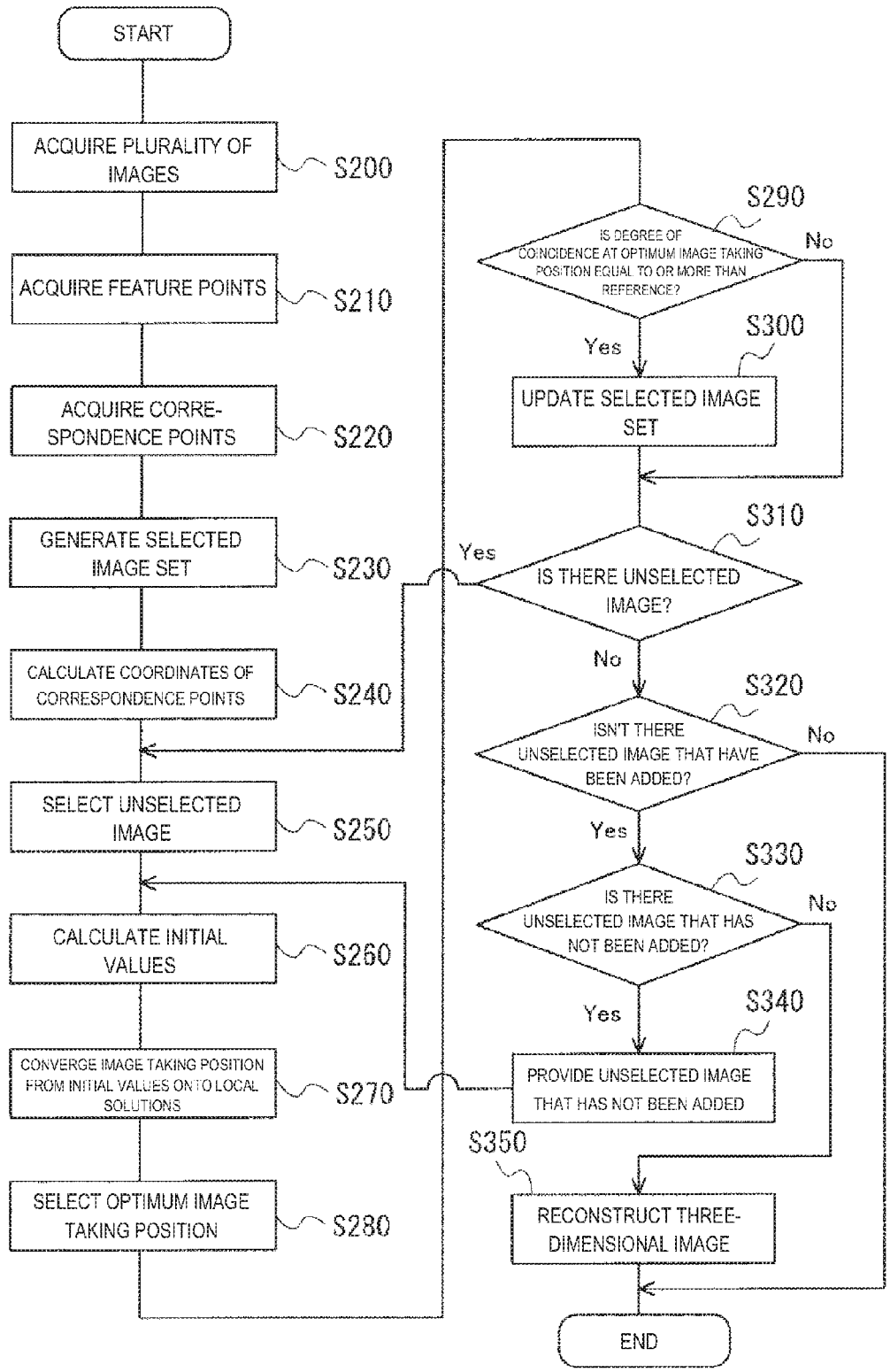

[Figure 3]
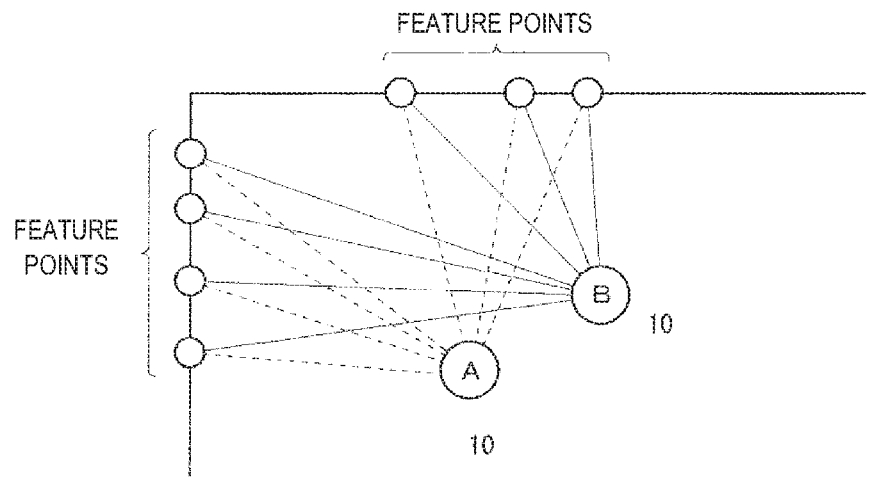
[Figure 4]
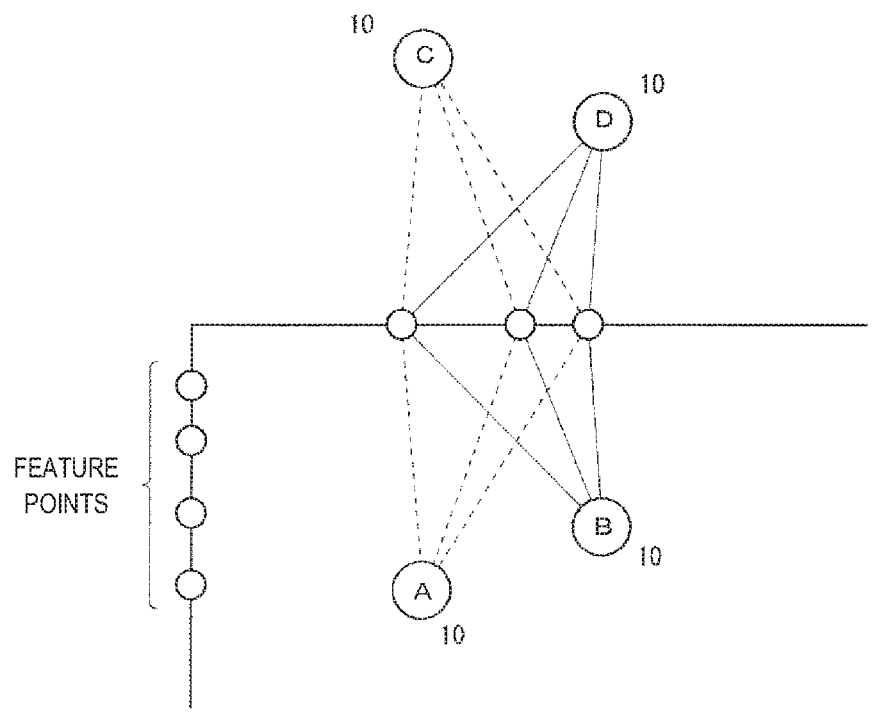

[Figure 5]
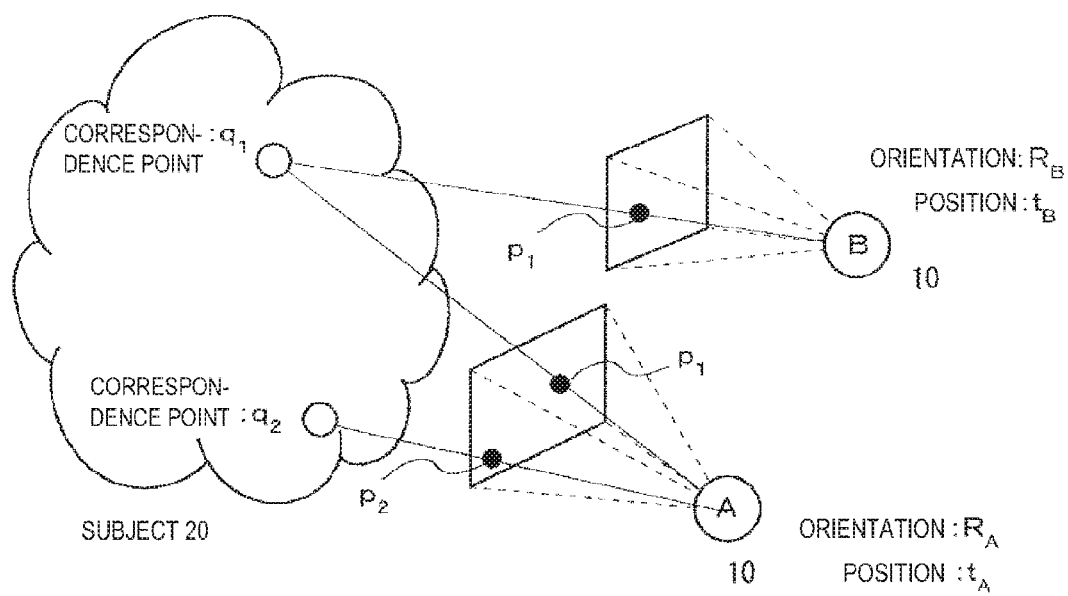

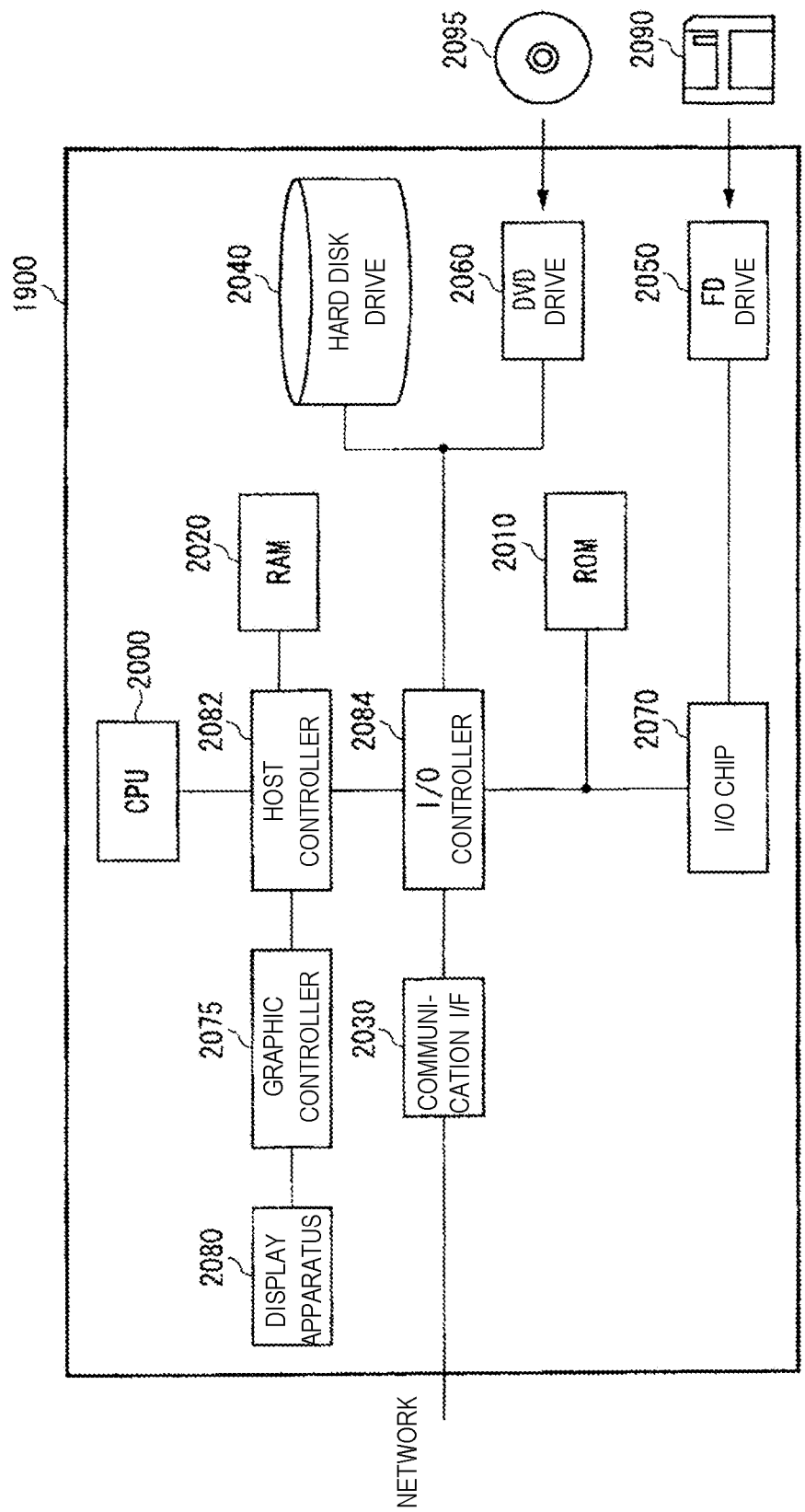
[Figure 6]

PROCESSING APPARATUS, PROCESSING METHOD, AND PROGRAM FOR DETERMINING AN IMAGE TAKING POSITION

CROSS-REFERENCE TO RELATED APPLICATION

This application is based upon and claims priority from prior Japanese patent application number 2014-256062, filed Dec. 18, 2014, the entire contents of which are hereby incorporated by reference herein.

TECHNICAL FIELD

The present invention relates to a processing apparatus, a processing method, and a program.

BACKGROUND ART

Up to now, a technique called Structure from Motion (SfM) and its related techniques have been known (see, for example, Patent Literatures 1 to 4 and Non-patent Literatures 1 to 3). According to such techniques, on the basis of a plurality of two-dimensional images obtained by taking images of a subject from different positions and orientations, the positions and the orientations of an image taking apparatus that has taken the two-dimensional images are calculated, and a three-dimensional shape of the subject is reconstructed.

CITATION LIST

Patent Literatures

Patent Literature 1 JP2013-218396A
Patent Literature 2 JP2011-8507A
Patent Literature 3 JP2010-102501A
Patent Literature 4 WO2012/032747

Non Patent Literatures

Non-patent Literature 1 "Bundler: Structure from Motion (SfM) for Unordered Image Collections", [Searched on Dec. 8, 2014], Internet <URL: http://www.cs.cornell.edu/snavely/bundler/>
Non-patent Literature 2 "Bundler Structure from Motion Toolkit", [Searched on Dec. 8, 2014], Internet <URL: https://github.com/snavely/bundler_sfm>
Non-patent Literature 3 Batra, D.; Nabbe, B.; Hebert, M.; "An Alternative Formulation for Five Point Relative Pose Problem", Motion and Video Computing, 2007. WMVC '07. IEEE Workshop, February, 2007

SUMMARY OF INVENTION

Technical Problems

Such techniques come down to a large-scale non-linear optimization problem having a large number of local solutions, and thus form an inconsistent three-dimensional image in many cases. Moreover, if an inconsistent image taking position is adopted, an image taking position of another image is calculated on the basis of the inconsistent image taking position, so that a stable operation is difficult due to chained inconsistencies. Moreover, because it is desirable that a plurality of correspondence points among a plurality of two-dimensional images can be detected in a wide range, the plurality of two-dimensional images are acquired using a special camera with a wide-angle lens, a fish-eye lens, or the like. Accordingly, desired are a method and an apparatus capable of processing in a healthy and realistic calculation time using two-dimensional images taken by a general camera with a lens having a narrow angle of view, a mobile terminal, and the like.

Solution to Problems

According to a first aspect of the present invention, provided is a processing apparatus that calculates an image taking position of each of a plurality of images, including: a storage unit for storing thereinto a selected image set including images whose image taking position has been calculated, the images being selected from among the plurality of images; a calculation unit for calculating a plurality of image taking position candidates for an unselected image of the plurality of images, on a basis of correspondence points in the image with the images included in the selected image set; a selection unit for selecting an optimum image taking position having a highest degree of coincidence in correspondence points, from among the plurality of image taking position candidates for the unselected image; and a determination unit for determining whether or not the unselected image is added to the selected image set, on a basis of the degree of coincidence at the optimum image taking position and the degree of coincidence at another image taking position candidate. Further provided are a processing method achieved by the processing apparatus and a program causing a computer to operate as the processing apparatus.

According to a second aspect of the present invention, provided is a processing apparatus that calculates an image taking position of each of a plurality of images, including: a storage unit for storing thereinto a selected image set including images whose image taking position has been calculated, the images being selected from among the plurality of images; an initial value calculating unit for calculating a plurality of initial values of image taking position candidates for an unselected image of the plurality of images, on a basis of correspondence points in the image with the images included in the selected image set; a convergence unit for converging the image taking position from each of the initial values of the plurality of image taking position candidates onto each local solution; a selection unit for selecting an optimum image taking position having a highest degree of coincidence in correspondence points, from among the plurality of image taking position candidates converged onto the respective local solutions; and a determination unit for determining whether or not the unselected image is added to the selected image set, on a basis of the degree of coincidence in the correspondence points at the optimum image taking position. Further provided are a processing method achieved by the processing apparatus and a program causing a computer to operate as the processing apparatus.

Note that necessary features of the present invention are not entirely listed above in the summary of the invention. Moreover, sub-combinations of these feature groups can also be included in the present invention.

BRIEF DESCRIPTION OF DRAWINGS

FIG. 1 illustrates a configuration example of a processing apparatus 100 according to the present embodiment;

FIG. 2 illustrates an operation flow of the processing apparatus 100 according to the present embodiment;

FIG. 3 illustrates an example of acquiring images having a large number of correspondence points therebetween;

FIG. 4 illustrates an example of acquiring images having a smaller number of correspondence points therebetween, compared with the example in FIG. 3;

FIG. 5 illustrates an example of a spatial arrangement in the case where an image taking apparatus 10 according to the present embodiment takes images of a subject 20; and FIG. 6 illustrates an example of a hardware configuration of a computer 1900 that functions as the data processing apparatus 100 according to the present embodiment.

DESCRIPTION OF EMBODIMENT

Hereinafter, the present invention is described through an embodiment of the invention, and the following embodiment is not intended to limit inventions according to the scope of claims. Moreover, all combinations of features described in the embodiment are not necessarily essential to solving means of the invention.

FIG. 1 illustrates a configuration example of a processing apparatus 100 according to the present embodiment. On the basis of a plurality of images obtained by taking images of a subject from different positions and orientations, the processing apparatus 100 calculates the image taking position of each of the plurality of images. The processing apparatus 100 calculates, for each image, a plurality of candidates of the image taking position and the orientation of an image taking apparatus that has taken the image, and determines whether or not to use each candidate for reconstruction of a three-dimensional shape of the subject, in accordance with the calculation result. The processing apparatus 100 includes an acquisition unit 110, a storage unit 120, a generation unit 130, a calculation unit 140, a selection unit 150, a determination unit 160, an adjustment unit 170, a provision unit 180, and a reconstruction unit 190.

The acquisition unit 110 acquires a plurality of images. The acquisition unit 110 acquires two-dimensional images obtained by taking images of the subject from different image taking positions and orientations. The acquisition unit 110 may acquire a plurality of images by reading out data thereof that is stored in a predetermined format in an external storage device such as a database. Moreover, the acquisition unit 110 may be connected to a network or the like, and may acquire a plurality of images via the network. Moreover, the acquisition unit 110 may be connected to an image taking apparatus, and may acquire two-dimensional images taken by the image taking apparatus. Alternatively, the acquisition unit 110 may be incorporated in the image taking apparatus, and may acquire two-dimensional images. The acquisition unit 110 stores the plurality of acquired images into the storage unit 120.

The storage unit 120 is connected to the acquisition unit 110, and stores thereinto the plurality of received images. Moreover, the storage unit 120 stores thereinto a selected image set including images whose image taking position has been calculated, the images being selected from among the plurality of images. Moreover, the storage unit 120 may store thereinto intermediate data, calculation results, parameters, and the like that are generated (or used) by the processing apparatus 100 in the course of processing the plurality of images. Moreover, in response to a request from each unit included in the processing apparatus 100, the storage unit 120 may supply the stored data to the request source. For example, in response to a request from the generation unit 130, the storage unit 120 supplies the plurality of stored images to the generation unit 130.

The generation unit 130 selects two or more images from among the plurality of images on the basis of correspondence points in each image to thereby generate an initial selected image set. For example, the generation unit 130 is connected to the storage unit 120, acquires correspondence points in each image of the plurality of images read out of the storage unit 120, and selects two or more images in accordance with the number of the correspondence points. Moreover, the generation unit 130 calculates a relative position of the images included in the generated initial selected image set and coordinates in a three-dimensional space, of each correspondence point. The generation unit 130 stores information on the generated initial selected image set into the storage unit 120.

The calculation unit 140 is connected to the storage unit 120, and calculates a plurality of image taking position candidates for an unselected image of the plurality of images, on the basis of correspondence points in the image with the images included in the read-out selected image set. The calculation unit 140 may be connected to the generation unit 130, and may start the calculation of the image taking position candidates in response to reception of a report that the generation unit 130 has generated the initial selected image set. Alternatively, the calculation unit 140 may start the calculation of the image taking position candidates in response to that the initial selected image set has been stored into the storage unit 120. The calculation unit 140 includes an initial value calculating unit 142 and a convergence unit 144.

The initial value calculating unit 142 calculates a plurality of initial values of the image taking position candidates for the unselected image. The initial value calculating unit 142 calculates a plurality of initial values of the image taking position candidates for the unselected image of the plurality of images, on the basis of the correspondence points in the image with the images included in the selected image set. The initial value calculating unit 142 calculates an initial value of an image taking position candidate for each combination of a predetermined number of correspondence points of the plurality of correspondence points included in the image of the unselected image. The initial value calculating unit 142 calculates initial values using a predetermined linear algebraic expression. The initial value calculating unit 142 supplies the plurality of calculated initial values to the convergence unit 144.

The convergence unit 144 is connected to the initial value calculating unit 142, and converges the image taking position from each of the received initial values of the plurality of image taking position candidates onto each local solution. The convergence unit 144 converges the image taking position from the plurality of initial values onto a plurality of local solutions through a numerical analysis such as a root-finding algorithm, and defines the plurality of local solutions as a plurality of image taking position candidates. The convergence unit 144 supplies the plurality of converged image taking position candidates to the selection unit 150.

The selection unit 150 is connected to the calculation unit 140, and selects an optimum image taking position having the highest degree of coincidence in correspondence points, from among the plurality of received image taking position candidates for the unselected image. The selection unit 150 may calculate the degree of coincidence in the plurality of correspondence points for each image taking position candidate, using the plurality of correspondence points included in the image of the unselected image. The selection unit 150 supplies, to the determination unit 160, information on the selected optimum image taking position and the other image taking positions in association with the respective calculated degrees of coincidence in the correspondence points.

The determination unit 160 is connected to the selection unit 150, and determines whether or not the unselected image is added to the selected image set, on the basis of the received degree of coincidence at the optimum image taking position and the received degrees of coincidence at the other image taking position candidates. In response to that the degree of coincidence at the optimum image taking position is equal to or more than a predetermined reference compared with the degrees of coincidence at the other image taking positions, the determination unit 160 determines that the unselected image is added to the selected image set. In the case where the determination unit 160 determines the addition of the unselected image, the determination unit 160 adds the unselected image to the selected image set stored in the storage unit 120. Moreover, in the case where the determination unit 160 determines the non-addition of the unselected image, the determination unit 160 reports this determination result to the provision unit 180.

In response to that the unselected image has been newly added to the selected image set, the adjustment unit 170 adjusts the image taking position of each of the images included in the selected image set. The adjustment unit 170 is connected to the determination unit 160, and adjusts the image taking position of each image in the new selected image set including: the selected image set stored in the storage unit 120; and the unselected image whose addition is determined. The adjustment unit 170 stores the new selected image set after the adjustment into the storage unit 120 to thereby update the selected image set.

The provision unit 180 is connected to the determination unit 160, and acquires the result that the unselected image has not been added to the selected image set. The provision unit 180 may store the result in association with the unselected image into the storage unit 120. Alternatively, the provision unit 180 may include a storage device, and may store the result and information on the unselected image into the storage device.

Moreover, the provision unit 180 sequentially selects the unselected image from among images that are not included in the selected image set, of the plurality of images, and provides the unselected image to the calculation unit 140. The provision unit 180 may select again, as the unselected image, an image that is determined not to be added to the selected image set, after another image is added to the selected image set. That is, after it is determined whether or not another image is added to the selected image set, the provision unit 180 provides, as the unselected image, an image that is once determined not to be added to the selected image set, to the calculation unit 140, and causes the calculation unit 140 to determine again whether or not this image is added to the selected image set.

The reconstruction unit 190 is connected to the storage unit 120, and reconstructs a three-dimensional shape of the image taking target on the basis of the images included in the selected image set and the respective image taking positions thereof. The reconstruction unit 190 may calculate three-dimensional coordinates of the subject as the image taking target. After the end of the addition and update of the images in the selected image set, the reconstruction unit 190 reconstructs the three-dimensional shape of the image taking target using the last updated selected image set. The reconstruction unit 190 may be connected to the calculation unit 140, and may receive a report that the addition and update of the images in the selected image set has been ended, from the calculation unit 140.

The processing apparatus 100 configured as described above according to the present embodiment reconstructs the three-dimensional shape of the subject as the image taking target, using the selected image set that is determined to be used for the reconstruction of the three-dimensional shape of the subject. An operation of updating the selected image set and reconstructing the three-dimensional shape by the processing apparatus 100 is described with reference to FIG. 2.

FIG. 2 illustrates an operation flow of the processing apparatus 100 according to the present embodiment. In the present embodiment, description is given of an example in which, on the basis of a plurality of acquired images, the processing apparatus 100 reconstructs a three-dimensional shape of a subject taken on the plurality of images by executing processes in S200 to S350.

First, the acquisition unit 110 acquires a plurality of images (S200). The acquisition unit 110 may acquire a plurality of images that are taken by an image taking apparatus having an angle of view that is less than 100°, that is, about several tens of degrees. In particular, the acquisition unit 110 may acquire a plurality of images that are taken by a normal lens, a telephoto lens, a zoom lens, and the like each having an angle of view that is equal to or less than about 50°. The storage unit 120 stores thereinto the plurality of images acquired by the acquisition unit 110.

Subsequently, the generation unit 130 reads the plurality of images out of the storage unit 120, and acquires feature points included in each of the plurality of images (S210). Here, the feature points include a point, a line, and a shape characteristic of the subject taken on the plurality of images. The generation unit 130 may define, as the feature points, for example, a straight portion, a corner portion, an apex, a convex portion, a concave portion, a curved shape, an edge, an outline, an intersection point between lines, an angle between intersecting lines, a point of change in color, and a point of change in brightness of the subject. The generation unit 130 acquires such feature points for each image.

Subsequently, the generation unit 130 acquires correspondence points between images on the basis of the feature points acquired for each image (S220). Here, a correspondence point between one image and another image is a feature point acquired from the same portion of the subject, and is a feature point that associates the one image with the another image. The generation unit 130 may acquire feature points and correspondence points using edge detection, region division, image restoration, brightness value conversion, local correlation, matching, linear search, user's manual input, and the like.

Moreover, the generation unit 130 may acquire feature points and correspondence points using a known algorithm such as Scale-Invariant Feature Transform (SIFT), Speeded Up Robust Features (SURF), Harris, Features from Accelerated Segment Test (FAST), Hessian-Affine, Maximally Stable Extremal Regions (MSER), KAZE, and ORB. The generation unit 130 may store information on the acquired correspondence points in association with the respective plurality of acquired images into the storage unit 120.

Subsequently, the generation unit 130 generates an initial selected image set (S230). The generation unit 130 may select a pair of images having the largest number of correspondence points therebetween, from among combinations of the plurality of images, and may define the pair of images as the initial selected image set. Moreover, in the case where three or more images have the largest number of correspondence points thereamong, the generation unit 130 may define two images having a larger number of feature points, as the initial selected image set. Alternatively, the generation unit 130 may define a combination of three or more images having a large number of correspondence points thereamong, as the initial selected image set.

Subsequently, the generation unit 130 calculates coordinates in a three-dimensional space, of the correspondence points in the generated initial selected image set (S240). The generation unit 130 may calculate a relative position of the correspondence points, and then may calculate the coordinates thereof in the three-dimensional space. Here, the generation unit 130 calculates the relative position of the correspondence points using, for example, a known algorithm such as a five-point method (see Non-patent Literature 3 and the like) and an eight-point method. That is, the generation unit 130 calculates the relative position of the correspondence points on the basis of the fact that the number of the correspondence points in the initial selected image set is equal to or more than five or eight. Here, it is preferable that the number of the correspondence points in the initial selected image set be equal to or more than several tens, and it is more preferable that the number thereof be equal to or more than one hundred.

The generation unit 130 calculates the coordinates in the three-dimensional space, of the correspondence points on the basis of the calculated relative position of the correspondence points. Because the relative position of the plurality of correspondence points is known, the generation unit 130 can calculate a position t and an orientation R of the image taking apparatus that has taken the images (as an example, two images) included in the initial selected image set, that is, the generation unit 130 can calculate the coordinates in the three-dimensional space, of the correspondence points. The generation unit 130 may store information on the initial selected image set as described above into the storage unit 120, and may report the generation of the initial selected image set to the calculation unit 140.

In this way, in the case where the number of correspondence points in each image is large, coordinates in a three-dimensional space, of the correspondence points can be calculated using a known algorithm or the like. Meanwhile, if the number of correspondence points is small, a plurality of local solutions exist for arrangements (the position t and the orientation R) to be calculated of the image taking apparatus, it is difficult to accurately calculate a relative position of the correspondence points. An example in which such local solutions exist is described with reference to FIG. 3 and FIG. 4.

FIG. 3 illustrates an example of acquiring images by an image taking apparatus having a large angle of view. FIG. 3 illustrates an example of taking images from different positions and orientations of an image taking apparatus 10. Two taken images each include seven feature points, and the seven feature points are each acquired as a correspondence point obtained by taking an image of the same point. In this way, if images having a large number of correspondence points therebetween over a wider range are used, the arrangements A and B of the image taking apparatus 10 do not have a local solution, and can be uniquely calculated. Such images can be taken in some cases by using, for example, a lens having an angle of view that is equal to or more than 100°, such as a wide-angle lens and a fish-eye lens.

FIG. 4 illustrates an example of acquiring images by an image taking apparatus having a smaller angle of view, compared with the example in FIG. 3. That is, FIG. 4 illustrates an example of taking images from different positions and orientations of the image taking apparatus 10. Two taken images each include three feature points, and the three feature points are each acquired as a correspondence point obtained by taking an image of the same point. If images that are taken in a limited region as described above are used, the positions and the orientations of the image taking apparatus 10 have different local solutions such as arrangements C and D, in addition to the arrangements A and B.

Such images are taken in many cases by, for example, a normal lens, a telephoto lens, and a zoom lens, and it is difficult to acquire a correct solution from a plurality of local solutions, using a known algorithm or the like. In view of this, even if images that are taken by an image taking apparatus having a small angle of view and thus cause a plurality of local solutions are used, the processing apparatus 100 according to the present embodiment calculates the image taking position of each of the images.

Subsequently, the calculation unit 140 selects one unselected image from among the plurality of images stored in the storage unit 120 (S250). The calculation unit 140 selects, as the unselected image, an image having the largest number of correspondence points with the images included in the selected image set, from among the plurality of images that are not included in the selected image set.

Subsequently, the initial value calculating unit 142 calculates initial values of image taking position candidates for the selected unselected image (S260). The initial value calculating unit 142 calculates approximate solutions to the image taking position for the unselected image on the basis of the correspondence points in the image with the images included in the selected image set, and defines the approximate solutions as the initial values of the image taking position candidates. As described next, the initial value calculating unit 142 uses an objective function obtained by approximating an objective function that is a multi-dimensional function with a non-linear constraint by a quadratic programming problem with no constraint, and calculates a plurality of approximate solutions using a known algorithm as RANdom SAmple Consensus (RANSAC).

FIG. 5 illustrates an example of a spatial arrangement in the case where the image taking apparatus 10 according to the present embodiment takes images of a subject 20. FIG. 5 illustrates an example in which: the image taking apparatus 10 takes images of the subject 20 at a point A and a point B; and the taken images each include a correspondence point q $(q_x, q_y, q_z)^T$. Here, T means a transposition, and the correspondence point q on global coordinates is represented by a column vector. At the point A, the image taking apparatus 10 takes an image of the subject 20 from a position $t_A$ and an orientation $R_A$. At the point B, the image taking apparatus 10 takes an image of the subject 20 from a position $t_B$ and an orientation $R_B$.

Note that the position t is one point on the global coordinates, and is represented by a column vector similarly to the correspondence point q. Moreover, the orientation R is represented by a composition of x-, y-, and z-directional orientations (vectors), and is represented by, for example, a determinant as shown in the following expression.

$$R = (\vec{x}, \vec{y}, \vec{z}),\ \vec{x} = \begin{pmatrix} a_x \\ a_y \\ a_z \end{pmatrix},\ \vec{y} = \begin{pmatrix} b_x \\ b_y \\ b_z \end{pmatrix},\ \vec{z} = \begin{pmatrix} c_x \\ c_y \\ c_z \end{pmatrix} \quad \text{Expression 1}$$

At the point A, the correspondence point q taken within the angle of view of the image taking apparatus 10 can be represented by $q'=(q_x', q_y', 1)^T$ on the coordinates of the image taking apparatus 10. This means that q' is located at coordinates (x', y') on a place at a distance of 1 from the point A and that the correspondence point q is located on an extended line of a segment from the point A to q'. Here, the correspondence point q' on the coordinates of the image taking apparatus 10 is a result of taking an image of the correspondence point q on the global coordinates from the position $t_A$ and the orientation $R_A$, and hence the following expression is established.

$$q = R_A(q' + t_A) \quad \text{Expression 2}$$

If Expression 2 is transformed, the correspondence point q' on the image is represented by the following expression.

$$q' = \begin{pmatrix} q'_x \\ q'_y \\ q'_z \end{pmatrix} = R_A^{-1}(q - t_A) \quad \text{Expression 3}$$

Note that, because a z component of q' is 1, Expression 3 can be represented by the following expression.

$$q' = \left( \frac{q'_x}{q'_z}, \frac{q'_y}{q'_z}, 1 \right)^T \quad \text{Expression 4}$$

Accordingly, assuming that the coordinates of a correspondence point of the unselected image is $p=(p_x, p_y, 1)^T$, $R_A$ and $t_A$ minimize a square error of p and q' represented by Expression 4. That is, $R_A$ and $t_A$ satisfy the following expression.

$$\min_{R,t} \sum_i \|q'_i - p_i\|^2 = \min_{R,t} \sum_i \left\| \begin{pmatrix} q'_{ix}/q'_{iz} \\ q'_{iy}/q'_{iz} \\ 1 \end{pmatrix} - \begin{pmatrix} p'_{ix} \\ p'_{iy} \\ 1 \end{pmatrix} \right\|^2 \quad \text{Expression 5}$$

Note that, if the unselected image is taken by an image taking apparatus having a small angle of view and if correspondence points in a limited region are used, Expression 5 becomes a multi-dimensional function having a plurality of local solutions as also described with reference to FIG. 4. Moreover, a non-linear constraint of $R^T R = 1$ about the orientation R of the image taking apparatus is placed on the multi-dimensional function, and hence an enormous amount of calculation is necessary even to obtain one local solution, so that it is extremely difficult to obtain a correct solution in a realistic time.

In view of this, the calculation unit 140 of the present embodiment approximates the objective function by a quadratic programming problem, lists a plurality of local solutions as image taking position candidates, and selects the most probable solution as the image taking position. Because the number of local solutions to the objective function shown in Expression 5 is several tens at most, if the local solutions can be calculated at a high speed using an approximate expression, the image taking position can be calculated in a realistic time. On the basis of the fact that the distance between the feature point q and the image taking apparatus 10 does not significantly vary among the plurality of images, the calculation unit 140 uses a linear approximate expression that is obtained as the following expression by multiplying the objective function in Expression 5 by $q_z^2$.

$$\min_{R,t} \sum_i \left\| \begin{pmatrix} q'_{ix} \\ q'_{iy} \\ q'_{iz} \end{pmatrix} - \begin{pmatrix} p'_{ix} q'_{iz} \\ p'_{iy} q'_{iz} \\ q'_{iz} \end{pmatrix} \right\|^2 \quad \text{Expression 6}$$

That is, $R_A$ and $t_A$ that make a differential of Expression 6 equal to zero are a solution that satisfies Expression 6. Moreover, in order to list a plurality of local solutions as image taking position candidates, the calculation unit 140 first causes the initial value calculating unit 142 to calculate a plurality of initial values of image taking position candidates that satisfy Expression 6. The initial value calculating unit 142 calculates a plurality of approximate solutions using a RANSAC algorithm as an example.

The initial value calculating unit 142 randomly extracts a predetermined number of correspondence points of a plurality of correspondence points, and calculates R and t such that the extracted correspondence points are applicable to Expression 6. The initial value calculating unit 142 counts the number of correspondence points that satisfy Expression 6, of the remaining correspondence points that have not been extracted, using the calculated R and t. In accordance with the counting result, the initial value calculating unit 142 determines whether or not to define the calculated R and t as an initial value of an image taking position candidate (RANSAC).

Here, description is given of an example in which the unselected image includes one hundred correspondence points. The initial value calculating unit 142 extracts ten (as an example) correspondence points from the one hundred correspondence points using a random number or the like as an example, and calculates R and t that make a differential of Expression 6 zero, using the ten correspondence points. Then, the initial value calculating unit 142 substitutes the calculated R and t into Expression 6, sequentially substitutes the remaining ninety correspondence points thereinto, and determines whether or not the calculation result is within a range of a predetermined threshold.

Here, there is no guarantee that all the one hundred correspondence points included in the unselected image are correct feature points (points obtained by correctly extracting features of the subject), and noise components and the like may happen to be extracted and determined as correspondence points. If the extracted ten points include a large number of correspondence points that are such inappropriate values as described above, which are not normally calculated as correspondence points, the initial value calculating unit 142 unfavorably calculates R and t that are greatly different from solutions to the objective function. To avoid this, the initial value calculating unit 142 sequentially substitutes the remaining ninety correspondence points into Expression 6, and determines whether or not the calculated R and t are appropriate as a solution candidate.

The remaining ninety correspondence points may also include correspondence points that are inappropriate values in some cases. Hence, even if the initial value calculating unit 142 uses the R and t calculated in accordance with the ten correspondence points including a small number of inappropriate values, if the initial value calculating unit 142 substitutes a correspondence point that is an inappropriate value of the remaining ninety points into Expression 6, the initial value calculating unit 142 may obtain a notably large value compared with a (normal) value that is expected in advance to be obtained as a square error. The initial value calculating unit 142 defines, as an outlier, such a calculation result out of the range of the predetermined threshold, whereas the initial value calculating unit 142 defines, as an inlier, a calculation result within the range of the threshold and counts the number of the inliers.

Here, if the initial value calculating unit 142 uses the R and t calculated in accordance with the ten correspondence points including a large number of inappropriate values, even if the initial value calculating unit 142 substitutes a correspondence point that is not an inappropriate value of the remaining ninety points into Expression 6, the initial value calculating unit 142 obtains an outlier. In this case, even if the initial value calculating unit 142 substitutes an inappropriate value thereinto, the initial value calculating unit 142 also obtains an outlier, and the counted number of inliers is smaller than the case of using the R and t calculated in accordance with the ten correspondence points including a small number of inappropriate values. That is, in the case where the counting result of the inliers is less than a predetermined number, the initial value calculating unit 142 determines that the calculated R and t are not appropriate as a solution candidate, and does not define the calculated R and t as the initial value of the image taking position candidate. Moreover, in the case where the counting result of the inliers is equal to or more than the predetermined number, the initial value calculating unit 142 defines the calculated R and t as the initial value of the image taking position candidate.

The initial value calculating unit 142 repeats calculation and determination (RANSAC) of R and t, to thereby calculate the initial values of the plurality of image taking position candidates. The initial value calculating unit 142 may repeat the calculation and determination until initial values of a predetermined number of image taking position candidates are obtained. Alternatively, the initial value calculating unit 142 may repeat the calculation and determination a predetermined number of times. Note that, because the initial value calculating unit 142 uses the approximate expression shown in Expression 6, the initial value calculating unit 142 can easily calculate the plurality of initial values using a linear algebra, and thus can calculate the initial values of the plurality of image taking position candidates at a high speed. Moreover, the accuracy of the approximation can be kept high unless the distance between the feature point q and the image taking apparatus 10 significantly varies. Hence, the plurality of initial values calculated by the initial value calculating unit 142 can be obtained as values in the vicinity of the plurality of local solutions.

Subsequently, the convergence unit 144 converges the image taking position from the initial values of the plurality of image taking position candidates as start points onto the local solutions in Expression 5 (S270). That is, the initial values calculated by the initial value calculating unit 142 are solutions that satisfy Expression 6 which is the approximate expression, and are approximate solutions that exist in the vicinity of the local solutions to the objective function Expression 5. Accordingly, the convergence unit 144 defines each initial value as a start point, and uses a known numerical analysis such as Newton's method, whereby the convergence unit 144 can converge the image taking position from the start point onto the local solution. Moreover, because the number of the initial values calculated by the initial value calculating unit 142 is more than one, the convergence unit 144 respectively defines the plurality of initial values as start points, whereby the convergence unit 144 can converge the image taking position onto the plurality of local solutions in the objective function Expression 5 and can list the plurality of local solutions.

The objective function is a multi-dimensional function determined by the position t and the orientation R of the image taking apparatus, and thus has a plurality of local solutions. Hence, even if a point g that satisfies Expression 5 is calculated through complicated numerical calculations, it is difficult to converge the image taking position onto one local solution on the basis of the point g. Further, even if the image taking position is converged onto one local solution on the basis of the point g, it is difficult to determine whether or not the one local solution is a solution that is appropriate as the position t and the orientation R of the image taking apparatus.

Under the circumstance, the initial value calculating unit 142 according to the present embodiment calculates the plurality of initial values located in the vicinity of the plurality of local solutions, and hence the convergence unit 144 can easily converge the image taking position onto each local solution. That is, the convergence unit 144 can acquire the plurality of local solutions, and can define each of the plurality of local solutions as an image taking position candidate for the unselected image.

Here, the convergence unit 144 may delete an overlapping image taking position candidate that converges on the same image taking position as that of another candidate within a range of a predetermined error. Depending on the accuracy of an adopted numerical process and the like, the convergence unit 144 may converge the image taking position from two or more different values onto the same local solution in some cases. Accordingly, the convergence unit 144 selects one value of such two or more values converged within a range of a predetermined value to obtain one image taking position candidate. Alternatively, the convergence unit 144 may define an average value of such converged two or more values as an image taking position candidate. In this way, the convergence unit 144 may prevent apparent non-existing local solutions from being increased by numerical calculations.

Note that description is given above of the example in which the convergence unit 144 converges the image taking position onto a local optimum solution using Expression 5. Alternatively, the convergence unit 144 may converge the image taking position onto a local solution using an expression different from Expression 5. Expression 5 is used to calculate a square error based on normal distribution, and the convergence unit 144 may use an objective function based on Student's t-distribution. The convergence unit 144 may use an objective function shown in the following expression.

$$\{\hat{R}, \hat{t}\} = \underset{R,t}{\mathrm{argmax}} \prod_i T(p_i - \Phi(q_i|R, t)|\nu) \qquad \text{Expression 7}$$

Here, $\phi(q_i|R, t)$ represents a point $p_i$ obtained by converting coordinates $q_i$ of a point in a three-dimensional space of the global coordinate system into the coordinate system of the image taking apparatus 10 and projecting the conversion result onto a taken image (a plane with z=1). That is, $\phi$ and q have such a relation as shown in the following expressions.

$$\Phi(q_i|R,t) = \Phi_i = s_i|s_{i,z}$$

$$s_i = R^T(q_i - t) \qquad \text{Expression 8}$$

Moreover, T in Expression 7 represents known distribution as shown in the following expression as Student's t-distribution.

$$T(x\mid v) = \frac{\Gamma\left(\frac{v+1}{2}\right)}{(v\pi)^{1/2}\Gamma\left(\frac{v}{2}\right)}\left(1 + \frac{\|x\|^2}{v}\right)^{-\frac{v+1}{2}} \quad \text{Expression 9}$$

Subsequently, the selection unit 150 selects an optimum image taking position having the highest degree of coincidence in the correspondence points, from among the plurality of image taking position candidates converged onto the respective local solutions (S280). The selection unit 150 substitutes each image taking position candidate into an objective function, and counts the number of inliers in the case where the plurality of correspondence points included in the unselected image are applied to the objective function. The selection unit 150 counts the number of inliers for each image taking position candidate, and selects an image taking position candidate for which the largest number of inliers is counted, as the optimum image taking position. That is, the selection unit 150 defines an image taking position candidate that makes larger the number of correspondence points to be applicable to the objective function, of the plurality of correspondence points, as the optimum image taking position. Moreover, the selection unit 150 defines an image taking position candidate for which the second largest number of inliers is counted, as the second optimum image taking position.

Subsequently, the determination unit 160 determines whether or not the unselected image is added to the selected image set, on the basis of the degree of coincidence in the correspondence points at the optimum image taking position. The determination unit 160 compares the degree of coincidence at the optimum image taking position with the degree of coincidence at another (for example, the second optimum) image taking position, to thereby determine whether or not the unselected image is added to the selected image set (S290). The determination unit 160 may determine that the unselected image is added to the selected image set, under a necessary condition that the difference between the degree of coincidence at the optimum image taking position and the degree of coincidence at the second optimum image taking position candidate of the plurality of image taking position candidates is equal to or more than a predetermined reference. As an example, in response to that the difference between the number of inliers $I_{1st}$ at the optimum image taking position and the number of inliers $I_{2nd}$ at the second optimum image taking position is equal to or more than a predetermined number, the determination unit 160 determines that the unselected image is added to the selected image set.

Moreover, the determination unit 160 may determine that the unselected image is added to the selected image set, under necessary conditions that the difference between the degree of coincidence at the optimum image taking position and the degree of coincidence at the second optimum image taking position candidate of the plurality of image taking position candidates is equal to or more than a predetermined reference and that the degree of coincidence at the optimum image taking position is equal to or more than a predetermined threshold. As an example, in response to that $I_{1st}$ is equal to or more than a predetermined first threshold and that $(I_{1st}-I_{2nd})/I_{1st}$ is equal to or more than a predetermined second threshold, the determination unit 160 determines that the unselected image is added to the selected image set.

As described above, in the case where the degree of coincidence at the optimum image taking position is obviously different from the degree of coincidence at the second optimum image taking position, the determination unit 160 adopts the optimum image taking position, and adds the unselected image to the selected image set. Consequently, the determination unit 160 can prevent the selected image set from including an unselected image whose optimum image taking position cannot be appropriately determined due to a plurality of opposing degrees of coincidence, and can add an image that does not cause an inconsistency in its image taking position (or an image with a reduce possibility of the occurrence of an inconsistency). As a result, also in the case of adding a next unselected image, the determination unit 160 can determine whether or not the unselected image is added, using the selected image set with a reduced probability of the occurrence of an inconsistency. Accordingly, the selected image set can reduce the occurrence of a failure in reconstruction of a three-dimensional image.

In the case where the determination unit 160 determines that the unselected image is added to the selected image set (S290: Yes), the adjustment unit 170 adds the unselected image whose addition is determined, to the selected image set, to obtain a new selected image set, and the adjustment unit 170 stores the new selected image set into the storage unit 120 to update the selected image set (S300). Here, the adjustment unit 170 may store the new selected image set into the storage unit 120 after adjusting the image taking positions in the new selected image set. The adjustment unit 170 updates the positions and the orientations of the image taking apparatus that has taken the plurality of images in the selected image set, according to, for example, a known adjusting method such as Bundler Adjust described in Non-patent Literatures 1 and 2.

Because the plurality of images in the selected image set are a set obtained by adding, by the determination unit 160, images whose image taking position is not inconsistent, the adjustment unit 170 can make fine adjustment to more appropriate image taking positions among the plurality of images, using a known image processing technique. Moreover, the adjustment unit 170 may make the fine adjustment each time the selected image set is updated. Alternatively, the adjustment unit 170 may make the fine adjustment, in response to that a predetermined number of (two or more) unselected images have been added to the selected image set.

Meanwhile, in the case where the determination unit 160 determines that the unselected image is not added to the selected image set (S290: No), the determination unit 160 reports this determination to the provision unit 180. The provision unit 180 may store the fact that the unselected image has not been added to the selected image set, in association with the unselected image into the storage unit 120.

Subsequently, in the case where there is still an unselected image stored in the storage unit 120 (S310: Yes), the processing apparatus 100 returns to the operation stage in S250. The processing apparatus 100 causes the calculation unit 140 to acquire a next unselected image, and causes the determination unit 160 to determine whether or not the next unselected image is added to the selected image set. The processing apparatus 100 repeats the operation from S250 to S310 until there is no longer any unselected image stored in the storage unit 120.

In the case where there is no longer any unselected image stored in the storage unit 120 (S310: No) and where there is no unselected image that has been added to the selected image set, the process is ended (S320: No). That is, in response to that no other image has been added to the selected image set after it is determined that all the images that are not included in the selected image set, of the plurality of images, are not added to the selected image set, the processing apparatus 100 ends the unselected image selecting process. In the case where addition to the selected image set is failed for all the unselected images as described above, the processing apparatus 100 stops the three-dimensional image reconstructing process based on the plurality of images acquired by the acquisition unit 110. In this case, the processing apparatus 100 may report that the plurality of images acquired by the acquisition unit 110 are abnormal, to a user.

Meanwhile, in the case where there is an unselected image that has been added to the selected image set (S320: Yes) and where there is an unselected image that has not been added to the selected image set by the determination unit 160 (S330: Yes), the provision unit 180 selects and provides the unselected image that has not been added to the selected image set, again as an unselected image to the calculation unit 140 (S340). The processing apparatus 100 returns to the operation stage in S260, and repeats the operation from S260 to S340 until there is no longer any unselected image that has not been added. Note that, in the case where there are a plurality of unselected images that have not been added to the selected image set, the provision unit 180 may provide the unselected images that have not been added, to the calculation unit 140 in the order in which the determination unit 160 determines the non-addition of the images.

Even for an image for which it is determined in the beginning that there are a plurality of opposing image taking positions, information on correspondence points and the like changes as the number of images in the selected image set increases. Accordingly, the provision unit 180 provides the unselected image that has not been added, again as an unselected image to the calculation unit 140, to thereby cause the calculation unit 140 to determine again whether or not the unselected image is added to the selected image set. Consequently, the provision unit 180 can examine the plurality of images acquired by the acquisition unit 110 without any waste, and can generate the selected image set including a larger number of images.

In the case where there is no unselected image that has not been added to the selected image set by the determination unit 160 (S330: No) or where the provision unit 180 ends providing the unselected image, the calculation unit 140 ends the unselected image acquisition, and reports the end to the reconstruction unit 190. The reconstruction unit 190 reads the generated selected image set out of the storage unit 120, and reconstructs a three-dimensional image in accordance with the selected image set (S350). Because the determination unit 160 adds images whose image taking position is not inconsistent while preventing an unselected image whose optimum image taking position cannot be appropriately determined from being added to the selected image set, the reconstruction unit 190 can reconstruct a three-dimensional image with a reduced failure.

The processing apparatus 100 configured as described above according to the present embodiment selects a selected image set in accordance with the number of correspondence points included in each of a plurality of images, and determines whether or not the remaining images are added to the selected image set, one by one. The processing apparatus 100 uses an objective function, acquires a plurality of local solutions to the objective function, and determines whether or not an unselected image is added to the selected image set, on the basis of an optimum local solution to the unselected image. Hence, the processing apparatus 100 can add the unselected image having a more probable image taking position as a solution, to the selected image set. Moreover, the processing apparatus 100 calculates a plurality of initial values at a high speed using an approximate expression of the objective function, and acquires the plurality of local solutions using a simple technique such as Newton's method. Hence, the processing apparatus 100 can complete the process at a high speed.

It is described above that the initial value calculating unit 142 according to the present embodiment calculates initial values of a plurality of image taking position candidates, and supplies the calculated initial values to the convergence unit 144. Here, in the case where the determination unit 160 compares the degrees of coincidence at the optimum image taking position and the second optimum image taking position with each other to determine whether or not the unselected image is added to the selected image set, initial values other than the initial values corresponding to the optimum image taking position and the second optimum image taking position, of the plurality of initial values calculated by the initial value calculating unit 142, are not used by the determination unit 160.

In view of this, in the case where the difference between: the degree of coincidence of an initial value having the highest degree of coincidence, of the initial values of the plurality of image taking position candidates; and the degree of coincidence of an initial value of a given image taking position candidate is equal to or more than a predetermined reference, the initial value calculating unit 142 may delete the given image taking position candidate. Consequently, the initial value calculating unit 142 can delete the initial value of the image taking position candidate that can be determined not to be used by the determination unit 160, so that the processing speed can be increased.

Moreover, it is described above that the determination unit 160 of the present embodiment counts the number of inliers as an example of the degree of coincidence at an image taking position. Alternatively, the determination unit 160 may define, as the degree of coincidence, a value of an objective function into which the image taking position is substituted in the case where a correspondence point is applied to the objective function. In this case, the determination unit 160 may define, as the degree of coincidence, an average value of values of the objective function in the case where a plurality of correspondence points are applied to the objective function.

Moreover, it is described above that the initial value calculating unit 142 of the present embodiment calculates R and t that make a differential of Expression 6 zero, and determines whether or not the calculated R and t are appropriate as a solution candidate. Alternatively, the initial value calculating unit 142 may sequentially determine the appropriateness of R and t.

For example, the initial value calculating unit 142 randomly extracts ten correspondence points from one hundred correspondence points, and calculates R and t that make a differential of Expression 6 zero, using the ten correspondence points. Then, the initial value calculating unit 142 substitutes the calculated R and t into Expression 6, sequentially substitutes the remaining ninety correspondence points thereinto, and adopts the calculated R in the case where the counting result of the inliers is equal to or more than a predetermined number (RANSAC). Note that the calculated R is not a solution to Expression 5, and thus is a non-orthogonal orientation matrix G more accurately. Accordingly, the initial value calculating unit 142 orthogonalizes the matrix G using a known technique, and calculates more accurate R.

The initial value calculating unit 142 repeats the process from the extraction of ten correspondence points to the calculation of R, to thereby calculate a plurality of R's. Note that, in the case where the plurality of calculated R's include a plurality of R's that can be regarded as being substantially the same as each other within a range of a predetermined value, the initial value calculating unit 142 may leave one R of the plurality of R's as a solution candidate, and may remove the other R. Subsequently, the initial value calculating unit 142 extracts one R of the plurality of R's, and calculates t that makes a differential of Expression 6 zero, using the extracted R. The initial value calculating unit 142 substitutes the extracted R and the calculated t into Expression 6, sequentially substitutes the correspondence points thereinto, and adopts the extracted R and the calculated t in the case where the counting result of the inliers is equal to or more than a predetermined number (RANSAC).

The initial value calculating unit 142 extracts a next R of the plurality of R's, repeats a similar operation, and determines whether or not to adopt a combination of R and t, in accordance with the counting result of the inliers. The initial value calculating unit 142 repeats such determination for all the plurality of R's, and determines that the adopted combinations of R and t are appropriate as solution candidates. Through such a two-stage RANSAC process, the initial value calculating unit 142 sequentially determines whether or not R and t are appropriate, and hence more accurate determination can be executed on initial values of image taking position candidates.

FIG. 6 illustrates an example of a hardware configuration of a computer 1900 that functions as the data processing apparatus 100 according to the present embodiment. The computer 1900 according to the present embodiment includes: a CPU peripheral unit including a CPU 2000, a RAM 2020, a graphic controller 2075, and a display apparatus 2080 that are connected to one another by a host controller 2082; an input/output unit including a communication interface 2030, a hard disk drive 2040, and a DVD drive 2060 that are connected to the host controller 2082 by an input/output controller 2084; and a legacy input/output unit including a ROM 2010, a flexible disk drive 2050, and an input/output chip 2070 that are connected to the input/output controller 2084.

The host controller 2082 connects the RAM 2020 to the CPU 2000 and the graphic controller 2075 that access the RAM 2020 at a high transfer rate. The CPU 2000 operates on the basis of programs stored in the ROM 2010 and the RAM 2020, and controls the respective units. The graphic controller 2075 acquires image data that is generated by the CPU 2000 or the like on a frame buffer provided in the RAM 2020, and displays the image data on the display apparatus 2080. Alternatively, the frame buffer for storing the image data generated by the CPU 2000 or the like may be provided in the graphic controller 2075.

The input/output controller 2084 connects the host controller 2082 to the communication interface 2030, the hard disk drive 2040, and the DVD drive 2060 that are relatively high-speed input/output apparatuses. The communication interface 2030 communicates with other apparatuses via a network. The hard disk drive 2040 stores thereinto programs and data used by the CPU 2000 in the computer 1900. The DVD drive 2060 reads programs or data out of a DVD-ROM 2095, and provides the programs or data to the hard disk drive 2040 via the RAM 2020.

Moreover, the ROM 2010, the flexible disk drive 2050, and relatively low-speed input/output apparatuses of the input/output chip 2070 are connected to the input/output controller 2084. The ROM 2010 stores thereinto a boot program executed at the time of activation of the computer 1900 and/or programs depending on hardware of the computer 1900. The flexible disk drive 2050 reads programs or data out of a flexible disk 2090, and provides the programs or data to the hard disk drive 2040 via the RAM 2020. The input/output chip 2070 connects the flexible disk drive 2050 to the input/output controller 2084, and connects various input/output apparatuses to the input/output controller 2084 via, for example, a parallel port, a serial port, a keyboard port, and a mouse port.

The programs that are provided to the hard disk drive 2040 via the RAM 2020 are used by a user while being stored in a recording medium such as the flexible disk 2090, the DVD-ROM 2095, or an IC card. The programs are read out of the recording medium, are installed on the hard disk drive 2040 in the computer 1900 via the RAM 2020, and are executed by the CPU 2000.

The programs are installed on the computer 1900, and cause the computer 1900 to function as the acquisition unit 110, the storage unit 120, the generation unit 130, the calculation unit 140, the initial value calculating unit 142, the convergence unit 144, the selection unit 150, the determination unit 160, the adjustment unit 170, the provision unit 180, and the reconstruction unit 190.

Information processing described in the programs is read onto the computer 1900 to thereby function as the acquisition unit 110, the storage unit 120, the generation unit 130, the calculation unit 140, the initial value calculating unit 142, the convergence unit 144, the selection unit 150, the determination unit 160, the adjustment unit 170, the provision unit 180, and the reconstruction unit 190 that are specific means achieved by cooperation of software and the above-mentioned various hardware resources. Then, information computing or working suited to an intended use of the computer 1900 according to the present embodiment is achieved by the specific means, whereby a special processing apparatus 100 suited to the intended use is constructed.

As an example, in the case where the computer 1900 communicates with an external apparatus or the like, the CPU 2000 executes a communication program loaded on the RAM 2020, and instructs the communication interface 2030 to perform a communication process, on the basis of a processing content described in the communication program. Under the control of the CPU 2000, the communication interface 2030 reads out transmission data stored in a transmission buffer area or the like provided on a storage device such as the RAM 2020, the hard disk drive 2040, the flexible disk 2090, or the DVD-ROM 2095, and transmits the transmission data to the network, or the communication interface 2030 writes reception data received from the network into a reception buffer area or the like provided on the storage device. In this way, the communication interface 2030 may transfer transmission/reception data with respect to the storage device according to a direct memory access (DMA) method. Alternatively, the CPU 2000 may read data out of the transfer-source storage device or communication interface 2030, and may write the data into the transfer-destination communication interface 2030 or storage device, to thereby transfer the transmission/reception data.

Moreover, the CPU 2000 reads, onto the RAM 2020, the entirety or a necessary portion of files, databases, or the like stored in an external storage device such as the hard disk drive 2040, the DVD drive 2060 (DVD-ROM 2095), and the flexible disk drive 2050 (flexible disk 2090) through DMA transfer or the like, and performs various processes on data on the RAM 2020. Then, the CPU 2000 writes the processed data back into the external storage device through DMA transfer or the like. In such a process, the RAM 2020 can be considered to temporarily hold the contents of the external storage device, and hence the RAM 2020, the external storage device, and the like are collectively referred to as a memory, a storage unit, a storage device, or the like in the present embodiment. Various pieces of information in various programs, pieces of data, tables, databases, and the like in the present embodiment are stored in the storage device as described above to become information processing targets. Note that the CPU 2000 may hold part of the RAM 2020 on a cache memory, and may read and write data on the cache memory. Even in such a mode, the cache memory serves as part of the function of the RAM 2020, and hence, in the present embodiment, the cache memory is also included in the RAM 2020, the memory, and/or the storage device unless distinctively defined.

Moreover, the CPU 2000 performs, on data read out of the RAM 2020, various processes including various computing, information working, condition determination, and information retrieval/replacement described in the present embodiment, which are designated by a command sequence of a program, and writes the data back into the RAM 2020. For example, in the case of making condition determination, the CPU 2000 determines whether or not a condition that various variables described in the present embodiment are more than, less than, equal to or more than, equal to or less than, or equal to another variable or constant is satisfied. In the case where the condition is established (or not established), the CPU 2000 proceeds to a different command sequence, or invokes a sub-routine.

Moreover, the CPU 2000 can retrieve information stored in files, databases, or the like in the storage device. For example, in the case where a plurality of entries in each of which an attribute value having a second attribute is associated with an attribute value having a first attribute are stored in the storage device, the CPU 2000 retrieves an entry in which the attribute value having the first attribute is coincident with a designated condition, from among the plurality of entries stored in the storage device, and the CPU 2000 reads out the attribute value having the second attribute stored in the retrieved entry, whereby the CPU 2000 can obtain the attribute value having the second attribute associated with the first attribute that satisfies the designated condition.

The programs or modules described above may be stored in an external recording medium. Examples of the adoptable recording medium include: optical recording media such as a DVD, Blu-ray®, and a CD; magneto-optical recording media such as a MO; tape media; and semiconductor memories such as an IC card, in addition to the flexible disk 2090 and the DVD-ROM 2095. Moreover, a storage device such as a hard disk or a RAM provided to a server system connected to a private communication network or the Internet may be used as the recording medium, and the programs may be provided to the computer 1900 via the network.

Hereinabove, the present invention has been described by way of the embodiment, but the technical range of the present invention is not limited to the range described above in the embodiment. It is obvious to those skilled in the art that various changes or improvements can be added to the above-mentioned embodiment. It is obvious from the scope of claims that modes to which such changes or improvements are added can also be included in the technical range of the present invention.

It should be noted that the execution order of processes such as operations, procedures, steps, and stages in apparatuses, systems, programs, and methods described in the scope of claims, the description, and the drawings can be achieved as an arbitrary order unless "earlier than", "prior to", and the like are specially clarified or unless an output in the previous process is used in the subsequent process. Even if operation flows in the scope of claims, the description, and the drawings are described using "first", "subsequently", and the like for convenience sake, execution in the order indicated by these terms is not meant to be essential.

REFERENCE SIGNS LIST

10 image taking apparatus, 20 subject, 100 processing apparatus, 110 acquisition unit, 120 storage unit, 130 generation unit, 140 calculation unit, 142 initial value calculating unit, 144 convergence unit, 150 selection unit, 160 determination unit, 170 adjustment unit, 180 provision unit, 190 reconstruction unit, 1900 computer, 2000 CPU, 2010 ROM, 2020 RAM, 2030 communication interface, 2040 hard disk drive, 2050 flexible disk drive, 2060 DVD drive, 2070 input/output chip, 2075 graphic controller, 2080 display apparatus, 2082 host controller, 2084 input/output controller, 2090 flexible disk, 2095 DVD-ROM.

What is claimed is:

1. An information processing system for calculating an image taking position of each of a plurality of images, the information processing system comprising:
    memory; and
    a processor communicatively coupled to the memory, wherein the processor comprises:
        a storage unit for storing thereinto a selected image set comprising images whose image taking position has been calculated, the images being selected from among the plurality of images;
        a calculation unit for calculating a plurality of image taking position candidates for an unselected image of the plurality of images, on a basis of correspondence points in the image with the images included in the selected image set;
        a selection unit for selecting an optimum image taking position having a highest degree of coincidence in correspondence points, from among the plurality of image taking position candidates for the unselected image;
        a determination unit for determining whether or not the unselected image is added to the selected image set, on a basis of the degree of coincidence at the optimum image taking position and the degree of coincidence at another image taking position candidate; and
        a reconstruction unit for reconstructing a three-dimensional shape of an image taking target on a basis of the images included in the selected image set and the respective image taking positions thereof.

2. The information processing system according to claim 1, wherein the determination unit determines that the unselected image is added to the selected image set, under a necessary condition that a difference between the degree of coincidence at the optimum image taking position and the degree of coincidence at a second optimum image taking position candidate of the plurality of image taking position candidates is equal to or more than a predetermined reference.

3. The information processing system according to claim 1, wherein the determination unit determines that the unselected image is added to the selected image set, under necessary conditions that the difference between the degree of coincidence at the optimum image taking position and the degree of coincidence at the second optimum image taking position candidate of the plurality of image taking position candidates is equal to or more than the predetermined reference and that the degree of coincidence at the optimum image taking position is equal to or more than a predetermined threshold.

4. The information processing system according to claim 1, further comprising:
a generation unit for selecting two or more images from among the plurality of images on a basis of correspondence points in each image to thereby generate an initial selected image set.

5. The information processing system according to claim 1, wherein the calculation unit comprises:
an initial value calculating unit for calculating a plurality of initial values of the image taking position candidates for the unselected image; and
a convergence unit for converging the image taking position from each of the initial values of the plurality of image taking position candidates onto each local solution.

6. The information processing system according to claim 5, wherein the convergence unit deletes an overlapping image taking position candidate that converges on the same image taking position as that of another candidate within a range of a predetermined error.

7. The information processing system according to claim 5, wherein the initial value calculating unit calculates approximate solutions to the image taking position for the unselected image on the basis of the correspondence points in the image with the images included in the selected image set, and defines the approximate solutions as the initial values of the image taking position candidates.

8. The information processing system according to claim 5, wherein in response to difference between
the degree of coincidence of an initial value having the highest degree of coincidence, of the initial values of the plurality of image taking position candidates, and
the degree of coincidence of an initial value of a given image taking position candidate is equal to or more than a predetermined reference,
the initial value calculating unit deletes the given image taking position candidate.

9. The information processing system according to claim 1, further comprising:
a provision unit for sequentially selecting the unselected image from among images that are not included in the selected image set, of the plurality of images, and providing the unselected image to the calculation unit, wherein the provision unit selects again, as the unselected image, an image that is determined not to be added to the selected image set, after another image is added to the selected image set.

10. The information processing system according to claim 9, wherein in response to that no other image has been added to the selected image set after it is determined that all the images that are not included in the selected image set, of the plurality of images, are not added to the selected image set, the provision unit ends the unselected image selecting process.

11. The information processing system according to claim 1, further comprising:
an adjustment unit for adjusting the image taking position of each of the images included in the selected image set, in response to that the unselected image has been newly added to the selected image set.

12. A method, with at least one information processing system, for calculating an image taking position of each of a plurality of images, the method comprising:
storing, by a processor of the information processing system, thereinto a selected image set including images whose image taking position has been calculated, the images being selected from among the plurality of images;
calculating, by the processor, a plurality of image taking position candidates for an unselected image of the plurality of images, on a basis of correspondence points in the image with the images included in the selected image set;
selecting, by the processor, an optimum image taking position having a highest degree of coincidence in correspondence points, from among the plurality of image taking position candidates for the unselected image;
determining, by the processor, whether or not the unselected image is added to the selected image set, on a basis of the degree of coincidence at the optimum image taking position and the degree of coincidence at another image taking position candidate; and
reconstructing, by the processor, a three-dimensional shape of an image taking target on a basis of the images included in the selected image set and the respective image taking positions thereof.

13. The method according to claim 12, further comprising:
determining that the unselected image is added to the selected image set, under a necessary condition that a difference between the degree of coincidence at the optimum image taking position and the degree of coincidence at a second optimum image taking position candidate of the plurality of image taking position candidates is equal to or more than a predetermined reference.

14. The method according to claim 12, further comprising:
determining that the unselected image is added to the selected image set, under necessary conditions that the difference between the degree of coincidence at the optimum image taking position and the degree of coincidence at the second optimum image taking position candidate of the plurality of image taking position candidates is equal to or more than the predetermined reference and that the degree of coincidence at the optimum image taking position is equal to or more than a predetermined threshold.

15. The method processing system according to claim 12, further comprising:
selecting two or more images from among the plurality of images on a basis of correspondence points in each image to thereby generate an initial selected image set.

16. A computer program product for calculating an image taking position of each of a plurality of images, the computer program product comprising:

a non-transitory storage medium readable by a processing circuit and storing instructions for execution by the processing circuit for performing a method comprising:

storing thereinto a selected image set including images whose image taking position has been calculated, the images being selected from among the plurality of images;

calculating a plurality of image taking position candidates for an unselected image of the plurality of images, on a basis of correspondence points in the image with the images included in the selected image set;

selecting an optimum image taking position having a highest degree of coincidence in correspondence points, from among the plurality of image taking position candidates for the unselected image;

determining whether or not the unselected image is added to the selected image set, on a basis of the degree of coincidence at the optimum image taking position and the degree of coincidence at another image taking position candidate; and reconstructing a three-dimensional shape of an image taking target on a basis of the images included in the selected image set and the respective image taking positions thereof.

17. The computer program product to claim 16, wherein the method further comprises:

determining that the unselected image is added to the selected image set, under a necessary condition that a difference between the degree of coincidence at the optimum image taking position and the degree of coincidence at a second optimum image taking position candidate of the plurality of image taking position candidates is equal to or more than a predetermined reference.

18. The computer program product to claim 16, wherein the method further comprises:

determining that the unselected image is added to the selected image set, under necessary conditions that the difference between the degree of coincidence at the optimum image taking position and the degree of coincidence at the second optimum image taking position candidate of the plurality of image taking position candidates is equal to or more than the predetermined reference and that the degree of coincidence at the optimum image taking position is equal to or more than a predetermined threshold.

19. The computer program product to claim 16, wherein the method further comprises:

selecting two or more images from among the plurality of images on a basis of correspondence points in each image to thereby generate an initial selected image set.

* * * * *